(12) United States Patent
Poiesz et al.

(10) Patent No.: US 9,906,621 B2
(45) Date of Patent: Feb. 27, 2018

(54) PROVIDING LANGUAGE RECOMMENDATIONS

(71) Applicant: Google Inc., Mountain View, CA (US)

(72) Inventors: Benjamin David Poiesz, Santa Clara, CA (US); Andrew Abramson, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 485 days.

(21) Appl. No.: 14/294,466

(22) Filed: Jun. 3, 2014

(65) Prior Publication Data

US 2015/0347378 A1    Dec. 3, 2015

(51) Int. Cl.
*G06F 17/27*   (2006.01)
*H04L 29/08*   (2006.01)
*G06F 17/30*   (2006.01)

(52) U.S. Cl.
CPC ...... *H04L 67/306* (2013.01); *G06F 17/30699* (2013.01); *G06F 17/30867* (2013.01)

(58) Field of Classification Search
CPC ............. G06F 17/275; G06F 17/30699; G06F 17/30867; H04L 67/306
See application file for complete search history.

(56) References Cited

U.S. PATENT DOCUMENTS

| | | | |
|---|---|---|---|
| 6,240,170 B1 | 5/2001 | Shaffer et al. | |
| 8,600,733 B1 | 12/2013 | Buryak et al. | |
| 8,650,561 B2 * | 2/2014 | Gharabally | G06F 9/4446 717/136 |
| 8,788,259 B1 * | 7/2014 | Buryak | G06F 9/4448 704/8 |
| 9,426,110 B2 * | 8/2016 | Aalbers | H04L 51/12 |
| 2003/0115186 A1 * | 6/2003 | Wilkinson | G06F 17/3087 |
| 2006/0074894 A1 * | 4/2006 | Remahl | G06F 17/30867 |
| 2007/0085835 A1 * | 4/2007 | Plestid | G06F 3/0237 345/171 |
| 2010/0287049 A1 * | 11/2010 | Rousso | G06Q 30/0255 705/14.53 |
| 2012/0017146 A1 | 1/2012 | Travieso et al. | |
| 2013/0226896 A1 * | 8/2013 | Chin | G06F 17/30867 707/709 |
| 2013/0325435 A1 * | 12/2013 | Hawkins | G06F 9/4448 704/8 |
| 2014/0039874 A1 * | 2/2014 | Pelosi | G06F 17/275 704/8 |
| 2014/0337425 A1 * | 11/2014 | Buryak | H04L 67/22 709/204 |
| 2015/0332672 A1 * | 11/2015 | Akbacak | G10L 15/18 704/257 |

\* cited by examiner

*Primary Examiner* — William Bashore
*Assistant Examiner* — Gregory A Distefano
(74) *Attorney, Agent, or Firm* — Fish & Richardson P.C.

(57) ABSTRACT

Methods, systems, and apparatus, including computer programs encoded on a computer storage medium, for receiving data indicating a particular language a user has associated with their user profile; identifying a different language that (i) the user has not previously associated with their user profile, and that (ii) a language recommendation engine has associated with the particular language; providing a recommendation to the user to associate the different language with their user profile; receiving, in response to the recommendation, an indication of whether to associate the different language with the user profile; and updating the user profile based on the indication.

17 Claims, 7 Drawing Sheets

PROVIDING LANGUAGE RECOMMENDATIONS

FIELD

The present disclosure discusses providing language recommendations to a user, e.g., for association with a user profile.

BACKGROUND

There are over sixty-nine hundred spoken languages in the world. However, many computing operating systems and applications support only a handful of these languages. For example, some applications only support certain popular languages such as English, French, or Spanish, requiring users to understand these languages in order to interact with the functionality provided by these applications.

SUMMARY

According to some innovative aspects of the subject matter described in this specification, a system can suggest a language that a user might understand, based on information that the system has about a user, such as an indication of other languages that a user has explicitly acknowledged that they understand. According to some examples, a system generates (or updates) a personalized language hierarchy, e.g., an ordered list of languages, associated with the user.

In some examples, the user can indicate that he understands Punjabi. In response, the system can provide a language recommendation to the user. For example, the system can access a fallback language matrix that associates an alternative language for the provided language, e.g., when the provided language is not supported by a mobile application. In some examples, for the provided language of Punjabi, the system can recommend Urdu as a language the user may understand by utilizing the fallback language matrix. The user can confirm that he understands Urdu, and the system can update the personalized language hierarchy to include Urdu.

Innovative aspects of the subject matter described in this specification may be embodied in methods that include the actions of receiving data indicating a particular language a user has associated with their user profile; identifying a different language that (i) the user has not previously associated with their user profile, and that (ii) a language recommendation engine has associated with the particular language; providing a recommendation to the user to associate the different language with their user profile; receiving, in response to the recommendation, an indication of whether to associate the different language with the user profile; and updating the user profile based on the indication.

Other embodiments of these aspects include corresponding systems, apparatus, and computer programs, configured to perform the actions of the methods, encoded on computer storage devices.

These and other embodiments may each optionally include one or more of the following features. For instance, receiving a confirmation to associate the different language with the user profile. Identifying a hierarchy of languages that the user has previously associated with their user profile, the hierarchy of languages including the particular language, and updating the hierarchy of languages to include the different language based on receiving the confirmation to associate the different language with the user profile. Associating the different language with the particular language as a fallback language for the particular language. Receiving a rank associated with the different language, and updating the hierarchy of languages based on the rank associated with the different language. Obtaining a matrix that associates, for one or more first languages that includes the particular language, one or more second languages for each first language, the one or more second languages including the different language. Dynamically identifying, for each of the one or more first languages, the one or more second languages based on query logs associated with a plurality of users. Dynamically identifying, for each of the one or more first languages, the one or more second languages based on downloads of one or more applications by a plurality of users that are accessed from an application marketplace. Receiving data indicating that the user is able to understand the particular language.

Innovative aspects of the subject matter described in this specification may be embodied in methods that include the actions of obtaining a hierarchy of languages that a user has associated with their user profile; obtaining a list of supported languages associated with an application that is executable on a computing device associated with the user; identifying a particular language from the list of supported languages that (i) the user has not previously associated with their user profile, and that (ii) a language recommendation engine has associated with one or more languages in the hierarchy of languages; providing a recommendation to the user to associate the particular language with their user profile; receiving, in response to the recommendation, an indication of whether to associate the particular language with the user profile; and updating the user profile based on the indication.

Other embodiments of these aspects include corresponding systems, apparatus, and computer programs, configured to perform the actions of the methods, encoded on computer storage devices.

These and other embodiments may each optionally include one or more of the following features. For instance, comparing each language of the hierarchy of language with each language of the list of supported language; based on the comparing, determining that the hierarchy of languages is exclusive of the languages of the list of supported languages; and in response to determining that the hierarchy of language is exclusive of the languages of the list of supported languages, identifying the particular language from the list of supported languages that (i) the user has not previously associated with their user profile, and that (ii) the language recommendation engine has associated with one or more languages in the hierarchy of languages. The particular language is a fallback language of at least one language of the hierarchy of languages. Obtaining a matrix that associates, for one or more first languages that includes at least one language of the hierarchy of languages, one or more second languages for each first language, the one or more second languages including the particular language. Dynamically identifying, for each of the one or more first languages, the one or more second languages based on query logs associated a plurality of users. Dynamically identifying, for each of the one or more first languages, the one or more second languages based on downloads of one or more applications by a plurality of users that are accessed from an application marketplace. Receiving a confirmation to associate the particular language with the user profile. Updating the hierarchy of languages to include the particular language based on receiving the confirmation to associate the particular language with the user profile. Receiving a rank associated with the particular language, and updating the hierarchy of languages based on the rank associated with the particular language.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

In the drawings, like reference symbols indicate like elements throughout.

DETAILED DESCRIPTION

Figure 1:
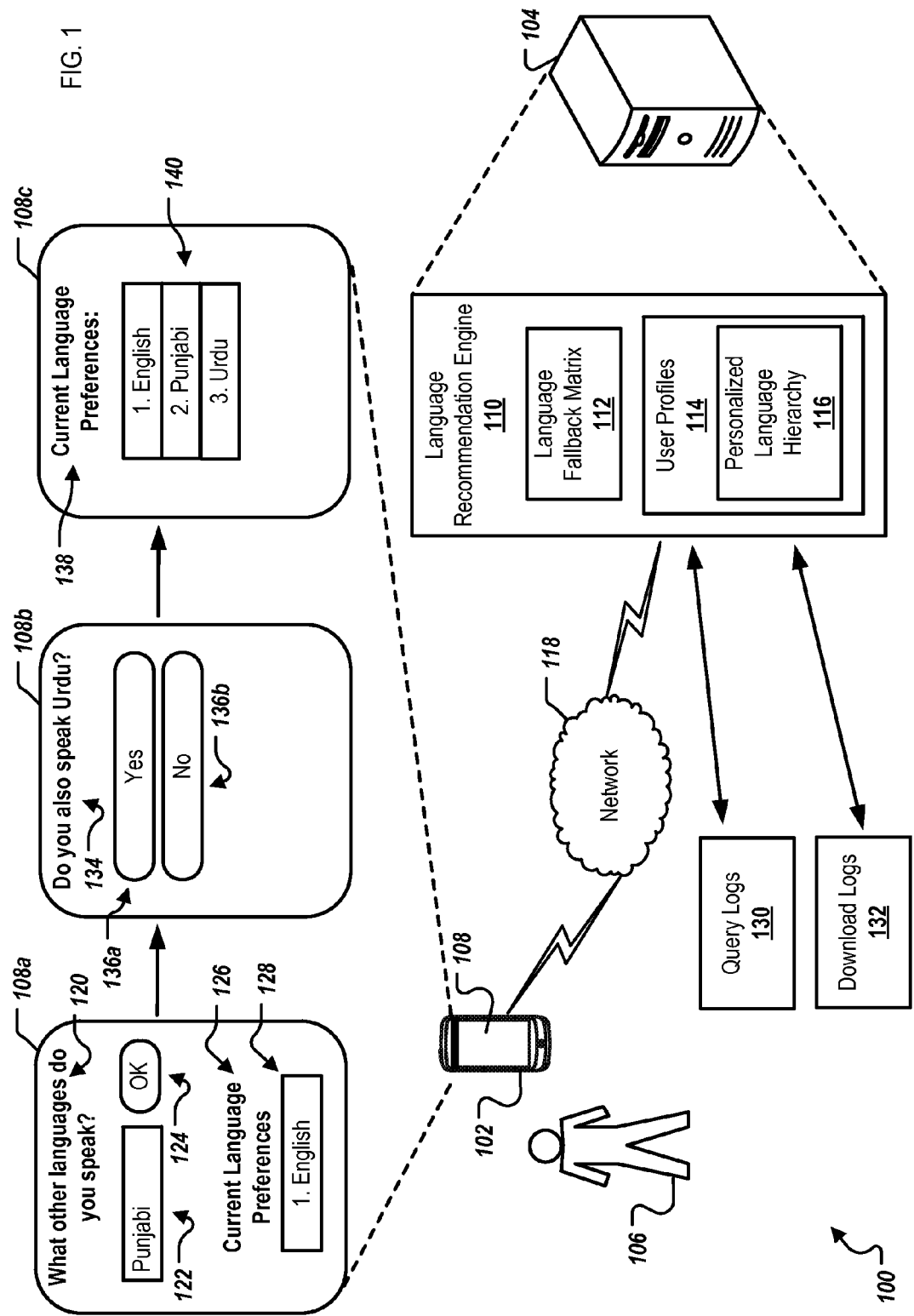
FIG. 1 depicts an example system for providing language recommendations.

FIG. 1 depicts a system 100 for providing language recommendations. In some examples, the system 100 includes a client computing device 102 and a server computing system 104. In some examples, the client computing device 102 is a mobile computing device, e.g., a mobile computing device 102. In some examples, the mobile computing device 102 includes a smartphone, a tablet-computing device, or a wearable computing device. The mobile computing device 102 is associated with a user 106 and includes a graphical user interface (GUI) 108 for receiving input from the user 106 and providing output to the user 106. The server computing system 104 includes a language recommendation engine 110. In some examples, the language recommendation engine 110 includes a language fallback matrix 112 and user profiles 114. In some examples, one or more of the user profiles 114 includes, or is associated with, a personalized language hierarchy 116. The server computing system 104 is in communication with the mobile computing device 102 over a network 118.

In some implementations, the language recommendation engine 110 receives data indicating a particular language that the user 106 has associated with their user profile 114, e.g., from the mobile computing device 102 over the network 118. Specifically, the mobile computing device 102 provides a first GUI 108a to the user 106 such that the user 106 can indicate which languages the user 106 understands. In some examples, the first GUI 108a includes text 120 indicating to the user 106 to provide the particular language the user 106 understands in a text box 122. For example, the text 120 includes "What other languages do you speak?" The user 106 provides text-input to the text box 122 indicating the particular language the user 106 understands. In some examples, the user 106 can provide the text-input to the text box 122 via a tactile keyboard associated with the mobile computing device 102, a touchscreen keyboard displayed via the first GUI 108a, or other input devices. In the illustrated example, the user 106 provides the text-input of Punjabi within the text box 122, and further selects the selectable button 124 to indicate that the user 106 understands the particular language of Punjabi.

In some examples, the user profile 114 of the user 106 is previously associated with one or more languages. That is, the user 106 previously indicated, e.g., via the text box 122 or other methods, the languages that the user 106 understands and that are further associated with the respective user profile 114. For example, the first GUI 108a includes text 126 indicating the languages that are previously associated with the user profile 114 of the user 106; and further includes a listing 128 of the languages that are previously associated with the user profile 114 of the user 106. For example, the text 126 includes "Current Language Preferences" and the listing 128 includes English as previously associated with the user profile 114 of the user 106.

In some implementations, the language recommendation engine 110 identifies a different language that is associated with the particular language and that the user 106 has not previously associated with the user profile 114. For example, the language recommendation engine 110 identifies a different language that is associated with Punjabi and that is not previously associated with the user profile, e.g., English. In some examples, the language recommendation engine 110 identifies the different language by obtaining the language fallback matrix 112.

In general, the language fallback matrix 112 is a mapping of alternative languages that can be used by the language recommendation engine 110 when a specific language is not supported by an application, or an operating system, of the mobile computing device 102. In other words, the language fallback matrix 112 maps, or associates, one or more first languages that are not supported by the application and/or the operating system of the mobile computing device 102 to one or more second languages, e.g., fallback languages, that are supported by the application and/or the operating system of the mobile computing device 102.

Figure 2:
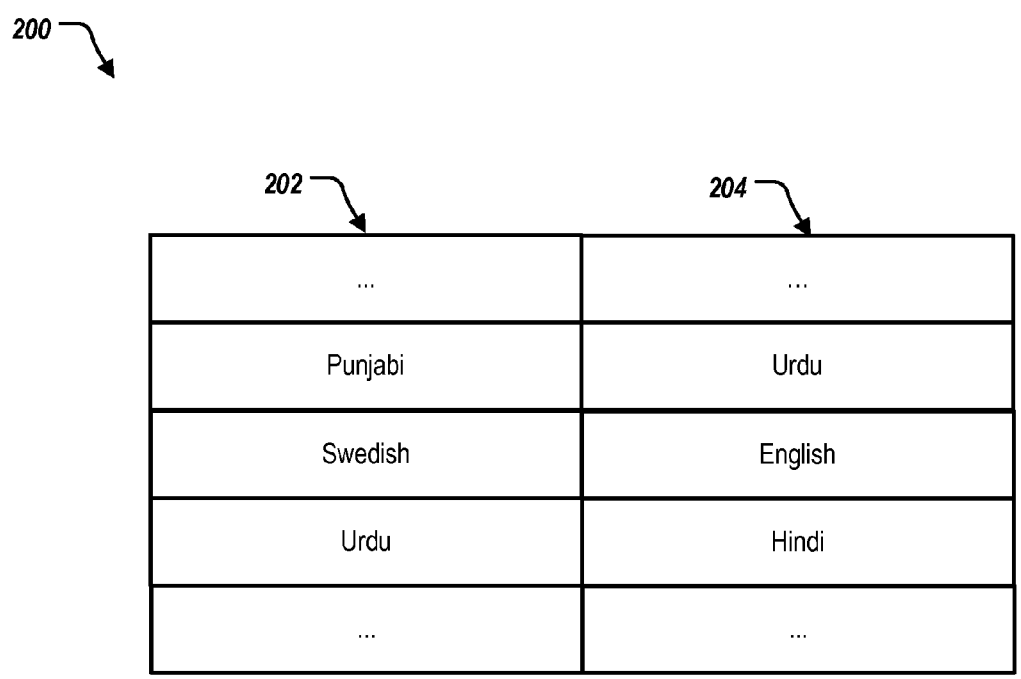
FIG. 2 depicts an example language fallback matrix.

In some examples, the one or more first languages include the particular language, e.g., Punjabi, and the one or more second languages include the different language. FIG. 2 illustrates an example language fallback matrix 200, analogous to the language fallback matrix 112. As illustrated, the language fallback matrix 200 associates first languages 202 with second languages 204. For example, as indicated by the language fallback matrix 200, the first language 202 of Punjabi is associated with the second language 204 of Urdu; the first language 202 of Swedish is associated with the second language 204 of English; and the first language 202 of Urdu is associated with the second language 204 of Hindi. Thus, based on the language fallback matrix 200, the language recommendation engine 110 identifies the different language that is associated with the particular language by identifying Punjabi from the first languages 202 and determining that the different language of Urdu of the second languages 204 is associated with Punjabi. Additionally, the language recommendation engine 110 determines that the different language of Urdu is not previously associated with the user profile 114. That is, the language recommendation engine 110 determines that the previously associated language of English with the user profile 114 of the user 106 is not the same as the different language of Urdu.

In some examples, the language recommendation engine 110 is further in communication with query logs 130, e.g., over one or more networks. The query logs 130 can be associated with a plurality of users, including the user 106, and include data associated with queries provided to a web searching service by the plurality of users. The associated data of the queries can include search results for the queries, and anonymized demographic data associated with the users providing the queries. The associated data of the queries can further include click through rates associated with the search results. To that end, the language recommendation engine 110 dynamically identifies the second languages 204 for each of the first languages 202 of the language fallback matrix 200 based on the query logs 130.

For example, a user of the plurality of users associated with the query logs 130 can submit queries in a specific language. In some examples, the user can also subsequently submit additional queries in a different language. The query logs 130 can indicate that the specific language and the different language are associated with each other based on the received query stream, e.g., the user understands the different language as well as the specific language. Additionally, for example, the user can submit a query in a specific language, and select a search result based on the query in a different language. The query logs 130 can indicate that the specific language and the different language are associated with each other based on the received user search result interaction. In some examples, the first languages 202 of the language fallback matrix 200 can include the specific language, and the second languages 204 can include the different language that is a fallback language for the specific language. In some examples, the first languages 202 of the language fallback matrix 200 can include the different language, and the second languages 204 can include the specific language that is a fallback language for the different language.

In some examples, the language recommendation engine 110 is further in communication with download logs 132, e.g., over one or more networks. The download logs 132 can be associated with a plurality of users, including the user 106, and include data associated with downloads of applications from an application marketplace. The associated data of the downloads can include which applications were downloaded, a number of downloads of the applications, and anoymized demographic data associated with the plurality of users downloading the applications. To that end, the language recommendation engine 110 dynamically identifies the second languages 204 for each of the first languages 202 of the language fallback matrix 200 based on the query download logs 132.

For example, a user of the plurality of users associated with the download logs 132 previously indicates that they understand a specific language, e.g., via a user profile associated with the user. The user can further download an application that only supports a different language. The download logs 132 can indicate that the specific language and the different language are associated with each other based on an application download interaction by the user, e.g., the user understands the different language as well as the specific language. In some examples, the first languages 202 of the language fallback matrix 200 can include the specific language, and the second languages 204 can include the different language that is a fallback language for the specific language. In some examples, the first languages 202 of the language fallback matrix 200 can include the different language, and the second languages 204 can include the specific language that is a fallback language for the different language.

In some implementations, the language recommendation engine 110 provides a recommendation to the user 106 to associate the different language with their user profile 114. Specifically, the mobile computing device 102 provides a second GUI 108*b* that provides for the display the recommendation to the user 106 of the different language. In some examples, the second GUI 108*b* includes text 134 indicating to the user 106 whether the user 106 is able to understand the different language that was identified by the language recommendation engine 110. That is, the text 134 includes the recommendation of the different language identified by the language recommendation engine 110 to associate with the user profile 114 of the user 106. For example, the text 134 includes "Do you speak Urdu?"

In some implementations, the language recommendation engine 110 receives, in response to the recommendation, an indication of whether to associate the different language with the user profile 114. Specifically, the second GUI 108*b* further includes selectable buttons 136*a* and 136*b* that the user is able to select to indicate whether to associate the different language with the user profile 114, e.g., whether the user 106 is able to understand the different language that was identified by the language recommendation engine 110. For example, upon selection of the selectable button 136*a* by the user 106, the language recommendation engine 110 receives a confirmation to associate the different language with the user profile 114 of the user 106. That is, the language recommendation engine 110 receives conformation to associate Urdu with the user profile 114 of the user 106. Further, for example, upon selection of the selectable button 136*b* by the user 106, the language recommendation engine 110 receives a confirmation to not associate the different language with the user profile 114 of the user 106.

In some implementations, the language recommendation engine 110 updates the user profile 114 of the user 106 based on the received indication. In some examples, when the language recommendation engine 110 receives the confirmation to associate the different language with the user profile 114, the language recommendation engine 110 associates the different language with the particular language as a fallback language for the particular language. In some examples, the fallback language includes a language such that when the particular language is not supported, e.g., by the operating system of the mobile computing device 102 and/or an application executed by the mobile computing device 102, the fallback language is utilized by the mobile computing device 102, e.g., during execution of an application. In some examples, the particular language can be associated with two or more fallback languages. For example, for the particular language of Punjabi that the user 106 indicated via input into text box 122, the language recommendation engine 110 identifies Urdu as a fallback language for Punjabi. Thus, during execution of the application by the mobile computing device 102, the mobile computing devices 102 and/or the application determines that the application does support Punjabi, e.g., the preferred language of the user 106. In response, the language recommendation engine 110 identifies the fallback language of Urdu such that the application is executed and provides for display text in the language of Urdu through the second GUI 108*b*.

In some examples, the language recommendation engine 110 identifies a personalized language hierarchy 116 previously associated with the user profile 114 of the user 106. The personalized language hierarchy 116 includes an ordered list of one or more languages, including the particular language, associated with the user profile 114 of the user 106 that the user 106 has indicated as understood by the user 106. In some examples, the personalized language hierarchy 116 includes languages that are suggested to the user 106, e.g., by the language recommendation engine 110, and that are confirmed by the user 106 as understood by the user 106. For example, the personalized language hierarchy 116 includes the different language that is identified by the language recommendation engine 110. In some examples, the language recommendation engine 110 updates the personalized language hierarchy 116 to include the different language based on receiving the conformation from the user 106 to associate the different language with the user profile 114 associated with the user 106.

In some examples, the language recommendation engine 110 receives a rank associated with the different language. That is, when the confirmation to associate the different language with the user profile 114 of the user 106 is provided, e.g., via the second GUI 108b, the user 106 can additionally provide a rank associated with the different language. For example, the user 106 can indicate that Urdu is to be associated with a rank of 3. Specifically, the rank of the different language indicates a positioning within the personalized language hierarchy 116, e.g., within the ordered list of languages. In some examples, the language recommendation engine 110 updates the personalized language hierarchy 116 based on the rank associated with the different language. For example, the language recommendation engine 110 updates the personalized language hierarchy 116 such that Urdu is ranked as the third language.

To that end, the mobile computing device 102 provides a third GUI 108c that provides for display a representation of the personalized language hierarchy 116 of the user 106 based on updating the user profile 114 and the confirmation to associate the different language with the user profile 114 of the user 106. In some examples, the third GUI 108c includes the text 138 indicating representation of the personalized language hierarchy 116 to the user and the representation 140 of the personalized language hierarchy 116. For example, the text 138 includes "Current Language Preferences" and the representation 140 includes the hierarchy of languages of "1. English," "2. Punjabi," and "3. Urdu." Thus, the personalized language hierarchy 116 is updated to include the different language of Urdu.

Figure 3:
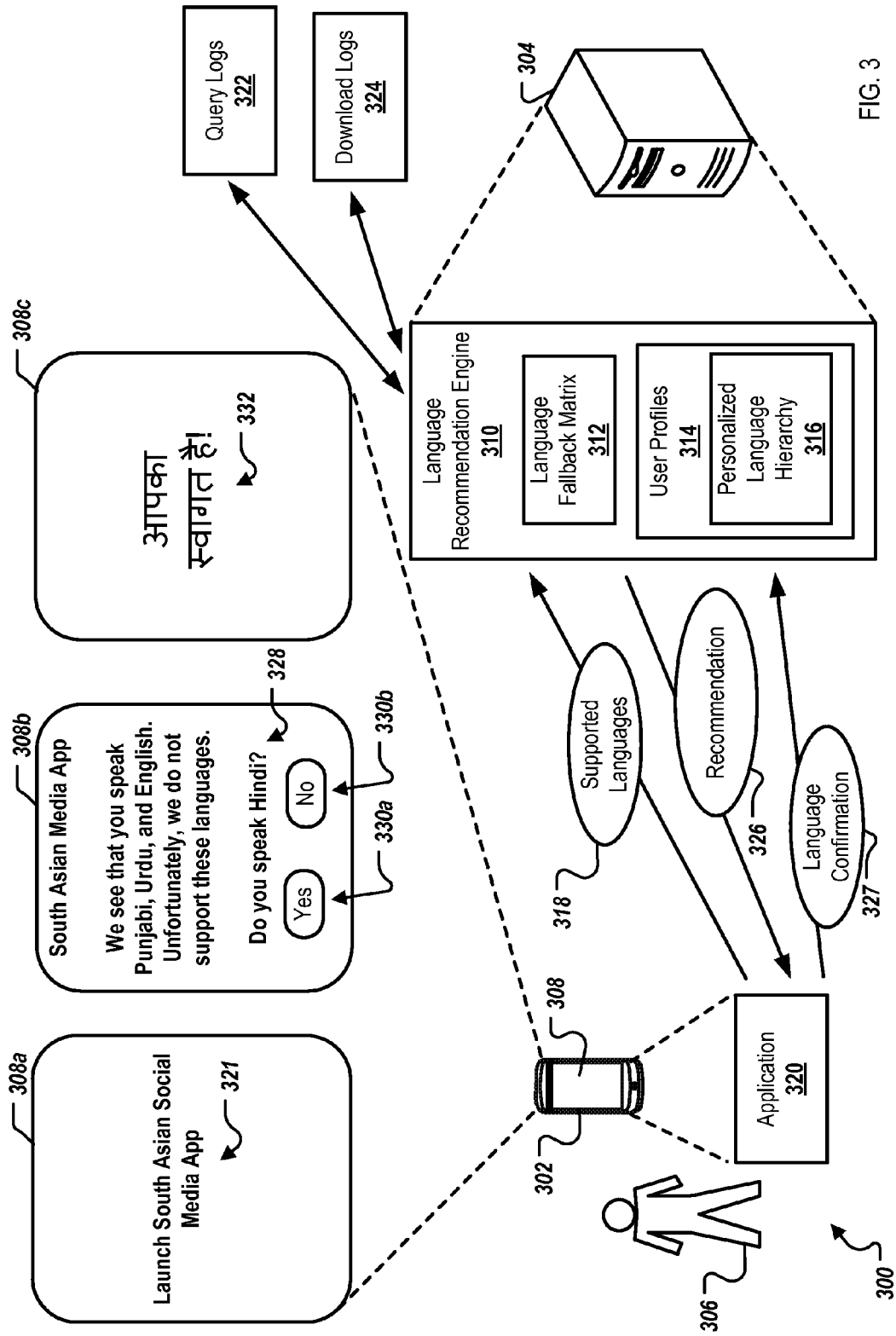
FIGS. 3-4 depict an example system for providing language recommendations.

FIG. 3 depicts a system 300 for providing language recommendations. Particularly, system 300 provides language recommendations to a user based on languages that are supported by an application. In some examples, the system 300 includes a client computing device 302 and a server computing system 304. In some examples, the client computing device 302 is a mobile computing device, e.g., a mobile computing device 302. In some examples, the mobile computing device 302 includes a smartphone, a tablet-computing device, or a wearable computing device. The mobile computing device 302 is associated with a user 306 and includes a graphical user interface (GUI) 308 for receiving input from the user 306 and providing output to the user 306. The server computing system 304 includes a language recommendation engine 310. In some examples, the language recommendation engine 310 includes a language fallback matrix 312 and user profiles 314. In some examples, one or more of the user profiles 314 includes, or is associated with, a personalized language hierarchy 316. The server computing system 304 is in communication with the mobile computing device 302 over one or more networks.

In some implementations, the language recommendation engine 310 obtains the personalized language hierarchy 316. In some examples, the user 306 has associated the personalized language hierarchy 316 with a respective user profile 314. The personalized language hierarchy 316 includes an ordered list of one or more languages associated with the user profile 314 of the user 306 that the user 306 has indicated as understood by the user 306. For example, continuing the example of FIG. 1, the personalized language hierarchy 316 can be analogous to the personalized language hierarchy 116 of FIG. 1, e.g., after updating the user profile 114. That is, the personalized language hierarchy 316 can include the languages English, Punjabi, and Urdu in the specified hierarchal order.

In some implementations, the language recommendation engine 310 obtains a list of languages 318 that are supported by an application 320 that is executable on the mobile computing device 302. In some examples, the application 320 supports languages by providing for display text of the supported language, and/or understanding input, e.g., from the user 306, associated with the supported language. For example, the list of languages 318 can include Hindi and Swedish. In some examples, the application 320 includes limited support for a language, e.g., during initial set-up and launch of the application. For example, the application 320 can include limited support for English during initial installation of the application 320, but does not include further support for the language during execution of the application 320.

In some examples, the mobile computing device 302 provides a first GUI 308a during execution of the application 320 by the mobile computing devices 304. For example, the application 320 can be associated with a South Asian social media application. To that end, the first GUI 308a includes text 321 indicating to the user 306 installation of the application on the mobile computing device 302, e.g., during an initial launch of the application 320. For example, the text 321 includes "Install South Asian Social Media App."

In some implementations, the language recommendation engine 310 identifies a particular language from the list of languages 318 that is associated with one or more languages of the personalized language hierarchy 316 and that has not been previously associated with the user profile 114. For example, the language recommendation engine 310 identifies a particular language that is associated with at least one of English, Punjabi, and Urdu of the personalized language hierarchy 316; and that the user 306 has not previously associated with the user profile 314, e.g., not one of English, Punjabi, and Urdu. In the illustrated example, the language recommendation engine 310 identifies the particular language of Hindi. That is, Hindi is not one of the languages previously associated with the user profile 314, e.g., English, Punjabi, and Urdu; and Hindi is associated with one or more of the languages of English Punjabi, and Urdu of the personalized language hierarchy 316, described further below.

In some examples, the language recommendation engine 310 identifies the particular language by comparing each language of the personalized language hierarchy 316 with each language of the list of languages 318. For example, the comparing by the language recommendation engine 310 can include determining whether any language of the personalized language hierarchy 316 matches, or is substantially similar, to any language of the list of languages 318. In some examples, based on the comparing, the language recommendation engine 310 determines that the personalized language hierarchy 316 is exclusive of the languages of the list of languages 318. For example, the language recommendation engine 310 determines that the languages of English, Punjabi, and Urdu of the personalized language hierarchy 316 are exclusive of the language of Hindi and Swedish of the list of languages 318. In some examples, in response to determining that the personalized language hierarchy 316 is exclusive of the languages of the list of languages 318, the language recommendation engine 310 identifies the particular language from the list of languages 318 that is associated with one or more languages of personalized language hierarchy 316 and that has not been previously associated with the user profile 314. For example, the language recommendation engine 310 identifies the particular language Hindi as Hindi is not one of the languages previously associated with the user profile 314, e.g., English, Punjabi, and Urdu; and Hindi is associated with one or more of the languages of English Punjabi, and Urdu of the personalized language hierarchy 316, described further below.

In some examples, the language recommendation engine 310 identifies the particular language by obtaining the language fallback matrix 312, analogous to the language fallback matrix 112 of FIG. 1. Specifically, the language fallback matrix 312 is a mapping of alternative languages that can be used by the language recommendation engine 310 when a language is not supported by the application 320. To that end, the language fallback matrix 312 associates one or more first languages with one or more second languages. Furthermore, the one or more first languages includes at least one language of the hierarchy of languages, e.g., English, Punjabi, Urdu, and the second languages includes the particular language. Specifically, the language recommendation engine 310 identifies Hindi as being associated with Urdu as provided by the language fallback matrix 312. As illustrated in FIG. 2, the example language fallback matrix 200, analogous to the language fallback matrix 312, the first language 202 of Urdu is associated with the second language 204 of Hindi. Thus, based on the language fallback matrix 200, the language recommendation engine 310 identifies the particular language that is associated with a language of the personalized language hierarchy 316 by identifying Urdu from the first languages 202 and determining that Hindi of the second languages 204 is associated with Urdu. Additionally, the language recommendation engine 310 determines that the particular language of Hindi is not previously associated with the user profile 314. That is, the language recommendation engine 310 determines that Hindi is not one of the languages of the personalized language hierarchy 316, e.g., English, Punjabi, Urdu.

In some examples, the particular language is a fallback language for at least one language of the personalized language hierarchy 316. For example, the particular language of Hindi is a fallback language for Urdu of the personalized language hierarchy 316. In other words, the fallback language is a language such that when a specific language is not supported, e.g., by the operating system of the mobile computing device 302 and/or an application executed by the mobile computing device 302, the fallback language is utilized by the mobile computing device 302, e.g., during execution of the application 320. In the illustrated example, for the language of Urdu of the personalized language hierarchy 316, the language recommendation engine 310 identifies Hindi as a fallback language for Urdu. Additionally, during execution of the application 320 by the mobile computing device 302, the mobile computing device 302 and/or the application 320 determines that the application 320 does support Punjabi, Urdu, and English, e.g., the languages of the personalized language hierarchy 316. In response, the language recommendation engine 310 identifies the fallback language of Hindi such that the application 320 is executed and provides for display Hindi text via the first GUI 308a. In some examples, the one or more of the languages of the personalized language hierarchy 316 can be associated with two or more fallback languages.

In some examples, the language recommendation engine 310 is further in communication with query logs 322, e.g., over one or more networks. The query logs 322 can be associated with a plurality of users, including the user 306, and include data associated with queries provided to a web searching service. The associated data of the queries can include search results for the queries, and anonymized demographic data associated with the users providing the queries. The associated data of the queries can further include click through rates associated with the search results. To that end, the language recommendation engine 310 dynamically identifies the second languages 204 for each of the first languages 202 of the language fallback matrix 200 based on the query logs 322.

For example, a user of the plurality of users associated with the query logs 322 can submit queries in a specific language. In some examples, the user can also subsequently submit additional queries in a different language. The query logs 322 can indicate that the specific language and the different language are associated with each other based on the received query stream, e.g., the user understand the different language as well as the specific language. Additionally, for example, the user can submit a query in a specific language, and select a search result based on the query in a different language. The query logs 322 can indicate that the specific language and the different language are associated with each other based on the received user search result interaction. In some examples, the first languages 202 of the language fallback matrix 200 can include the specific language, and the second languages 204 can include the different language that is a fallback language for the specific language. In some examples, the first languages 202 of the language fallback matrix 200 can include the different language, and the second languages 204 can include the specific language that is a fallback language for the different language.

In some examples, the language recommendation engine 310 is further in communication with download logs 324, e.g., over one or more networks. The download logs 324 can be associated with a plurality of users, including the user 306, and include data associated with downloads of applications from an application marketplace. The associated data of the downloads can include which applications were downloaded, a number of downloads of the applications, and anonymized demographic data associated with the plurality of users downloading the applications. To that end, the language recommendation engine 310 dynamically identifies the second languages 204 for each of the first languages 202 of the language fallback matrix 200 based on the download logs 324.

For example, a user of the plurality of users associated with the download logs 324 previously indicates that they understand a specific language, e.g., via a user profile associated with the user. The user can further download an application that only supports a different language. The download logs 324 can indicate that the specific language and the different language are associated with each other based on the application download interaction by the user, e.g., the user understands the different language as well as the specific language. In some examples, the first languages 202 of the language fallback matrix 200 can include the specific language, and the second languages 204 can include the different language that is a fallback language for the specific language. In some examples, the first languages 202 of the language fallback matrix 200 can include the different language, and the second languages 204 can include the specific language that is a fallback language for the different language.

In some implementations, the language recommendation engine 310 provides a recommendation 326 to the user 306 to associate the particular language with their user profile 314. Specifically, the language recommendation engine 310 provides the recommendation 326 to the mobile computing device 302, and particularly, the application 320. In response, the mobile computing device 302 provides a second GUI 308b that provides for the display the recommendation 326 to the user 306. In some examples, the second GUI 308b includes text 328 indicating to the user 306 that the application 320 does not support the languages of the personalized language hierarchy 316 associated with the user 306, and whether the user 306 is able to understand the recommended language that was identified by the language recommendation engine 310. That is, the text 328 includes the recommendation 328 of Hindi that was identified by the language recommendation engine 310 to associate with the user profile 314 of the user 306. For example, the text 328 includes "We see that you speak Punjabi, Urdu, and English. Unfortunately, we do not support these languages. Do you speak Hindi?"

In some implementations, the language recommendation engine 310 receives, in response to the recommendation 326, an indication of whether to associate the particular language with the user profile 314. Specifically, the second GUI 308b further includes selectable buttons 330a and 330b that the user is able to select to indicate whether to associate the particular language with the user profile 314, e.g., whether the user 306 is able to understand the particular language that was identified by the language recommendation engine 310. For example, upon selection of the selectable button 330a by the user 306, the language recommendation engine 310 receives a confirmation 327 to associate the particular language with the user profile 314 of the user 306. That is, the language recommendation engine 310 receives the conformation 327 to associate Hindi with the user profile 314 of the user 306. Further, for example, upon selection of the selectable button 330b by the user 306, the language recommendation engine 310 receives a confirmation to not associate the particular language with the user profile 314 of the user 306.

In some implementations, the language recommendation engine 310 updates the user profile 314 of the user 306 based on the received indication. In some examples, when the language recommendation engine 310 receives the confirmation 327 to associate the particular language with the user profile 314, the language recommendation engine 310 associates the particular language with at least one of the languages of the personalized language hierarchy 316 as a fallback language. In the illustrated example, the language recommendation engine 310 associates Hindi as a fallback language for Urdu. In some examples, the language recommendation engine 310 updates the personalized language hierarchy 316 to include the particular language based on receiving the conformation 327 from the user 306 to associate the particular language with the user profile 314 associated with the user 306. That is, the language recommendation engine 310 updates the personalized language hierarchy 316 to include Hindi.

In some examples, the language recommendation engine 310 receives a rank associated with the particular language. That is, when the confirmation 327 to associate the particular language with the user profile 314 of the user 306 is provided, e.g., via the second GUI 308b, the user 306 can additionally provide a rank associated with the particular language. For example, the user 306 can indicate that Hindi is to be associated with a rank of 4. Specifically, the rank of the particular language indicates a positioning of the language within the personalized language hierarchy 316. In some examples, the language recommendation engine 310 updates the personalized language hierarchy 316 based on the rank associated with the particular language. For example, the language recommendation engine 310 updates the personalized language hierarchy 316 such that Hindi is ranked as the fourth language.

To that end, the mobile computing device 302 provides a third GUI 308c that includes text 332 indicating a welcome message in the particular language. For example, the text 332 includes "Welcome" in Hindi.

Figure 4:
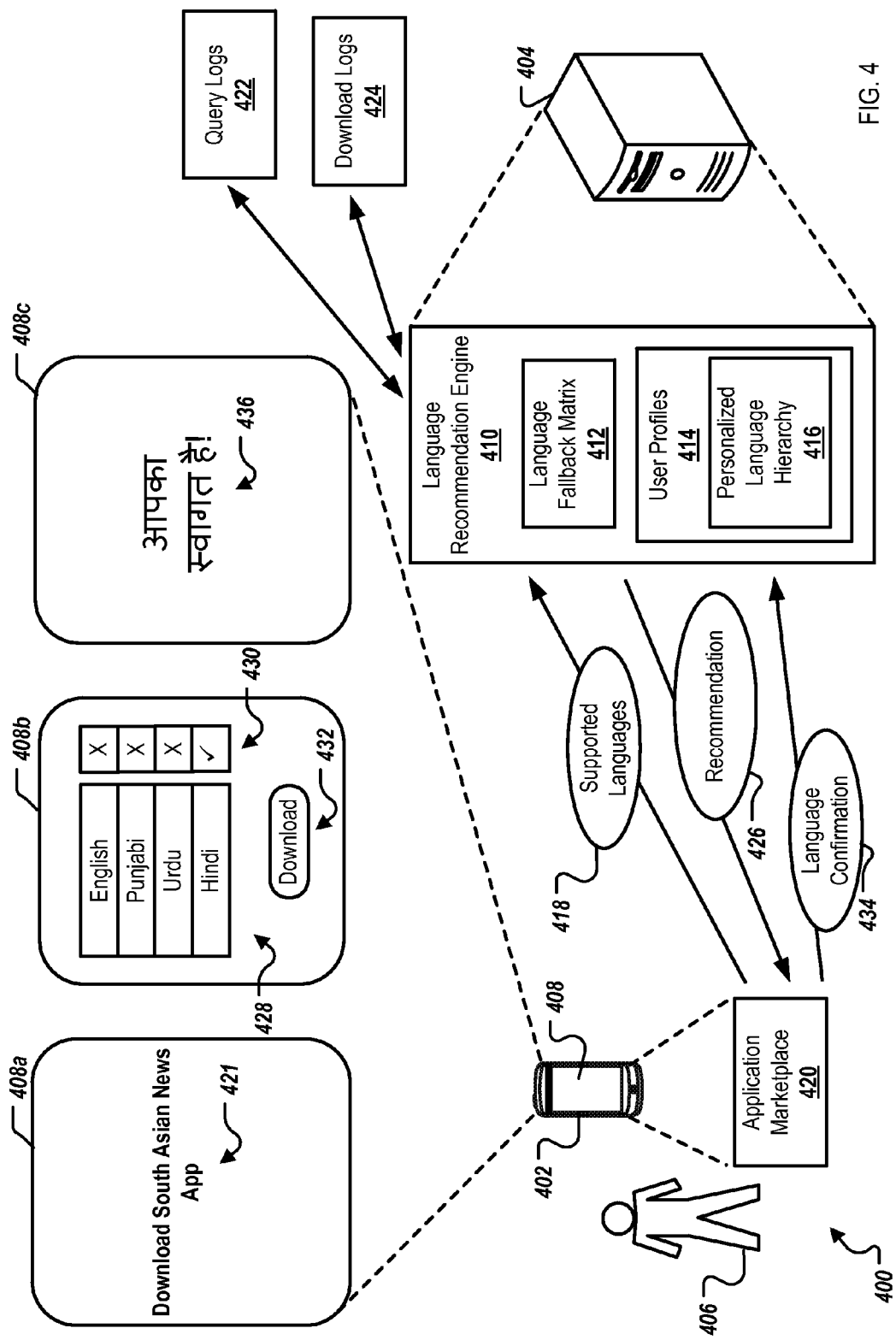

FIG. 4 depicts a system 400 for providing language recommendations. Particularly, system 400 provides language recommendations to a user based on languages that are supported by an application marketplace and/or an application available via the application marketplace. In some examples, the system 400 includes a client computing device 402 and a server computing system 404. In some examples, the client computing device 402 is a mobile computing device, e.g., a mobile computing device 402. In some examples, the mobile computing device 402 includes a smartphone, a tablet-computing device, or a wearable computing device. The mobile computing device 402 is associated with a user 406 and includes a graphical user interface (GUI) 408 for receiving input from the user 406 and providing output to the user 406. The server computing system 404 includes a language recommendation engine 410. In some examples, the language recommendation engine 410 includes a language fallback matrix 412 and user profiles 414. In some examples, one or more of the user profiles 414 includes, or is associated with, a personalized language hierarchy 416. The server computing system 404 is in communication with the mobile computing device 402 over one or more networks.

In some implementations, the language recommendation engine 410 obtains the personalized language hierarchy 416. In some examples, the user 406 has associated the personalized language hierarchy 416 with a respective user profile 414. The personalized language hierarchy 416 is an ordered list of one or more languages associated with the user profile 414 of the user 406 that the user 406 has indicated as understood. For example, continuing the example of FIG. 1, the personalized language hierarchy 416 can be analogous to the personalized language hierarchy 116 of FIG. 1, e.g., after updating the user profile 114. That is, the personalized language hierarchy 416 can include the languages English, Punjabi, and Urdu in the specified hierarchal order.

In some implementations, the language recommendation engine 410 obtains a list of languages 418 that are supported by an application marketplace 420 accessible by the mobile computing device 402 and/or supported by an application provided by the application marketplace 420. In some examples, the application marketplace 420 supports languages by providing for display text of the supported language, and/or understanding input, e.g., from the user 106, associated with the supported language. For example, the list of languages 418 can include Hindi and Swedish. In some examples, the application marketplace 420 includes limited support for a language, e.g., during downloading of an application from the application marketplace 420. For example, the application marketplace 420 can include limited support for English during downloading of an application from the application 420, but does not include further support for the language during execution of the application.

In some examples, the mobile computing device 402 provides a first GUI 408a during download of the application from the application marketplace 420 by the mobile computing device 404. For example, the application can be associated with a South Asian news application. To that end, the first GUI 408a includes text 421 indicating to the user 406 the download of the application on the mobile computing device 402. For example, the text 421 includes "Download South Asian News App."

In some implementations, the language recommendation engine 410 identifies a particular language from the list of languages 418 that is associated with one or more languages of the personalized language hierarchy 416 and that has been not previously associated with the user profile 414. For example, the language recommendation engine 410 identifies a particular language that is associated with at least one of English, Punjabi, and Urdu of the personalized language hierarchy 416; and that the user 406 has not previously associated with the user profile 414, e.g., not one of English, Punjabi, and Urdu. In the illustrated example, the language recommendation engine 410 identifies the particular language of Hindi. That is, Hindi is not one of the languages previously associated with the user profile 414, e.g., English, Punjabi, and Urdu; and Hindi is associated with one or more of the languages of English Punjabi, and Urdu of the personalized language hierarchy 416, described further below.

In some examples, the language recommendation engine 410 identifies the particular language by comparing each language of the personalized language hierarchy 416 with each language of the list of languages 418. For example, the comparing by the language recommendation engine 410 can include determining whether any language of the personalized language hierarchy 416 matches, or is substantially similar, to any language of the list of languages 418. In some examples, based on the comparing, the language recommendation engine 410 determines that the personalized language hierarchy 416 is exclusive of the languages of the list of languages 418. For example, the language recommendation engine 410 determines that the languages of English, Punjabi, and Urdu of the personalized language hierarchy 416 are exclusive of the language of Hindi and Swedish of the list of languages 418. In some examples, in response to determining that the personalized language hierarchy 416 is exclusive of the languages of the list of languages 418, the language recommendation engine 410 identifies the particular language from the list of languages 418 that is associated with one or more languages of personalized language hierarchy 416 and that has not previously associated with the user profile 414. For example, the language recommendation engine 410 identifies the particular language of Hindi as Hindi is not one of the languages previously associated with the user profile 414, e.g., English, Punjabi, and Urdu; and Hindi is associated with one or more of the languages of English Punjabi, and Urdu of the personalized language hierarchy 416, described further below.

In some examples, the language recommendation engine 410 identifies the particular language by obtaining the language fallback matrix 412, analogous to the language fallback matrix 112 of FIG. 1. Specifically, the language fallback matrix 412 is a mapping of alternative languages that can be used by the language recommendation engine 410 when a language is not supported by the application marketplace 420. To that end, the language fallback matrix 412 associates one or more first languages with one or more second languages. Furthermore, the one or more first languages includes at least one language of the hierarchy of languages, e.g., English, Punjabi, Urdu, and the second languages include the particular language. Specifically, the language recommendation engine 410 identifies Hindi as being associated with Urdu as provided by the language fallback matrix 412. As illustrated in FIG. 2, the example language fallback matrix 200, analogous to the language fallback matrix 412, the first language 202 of Urdu is associated with the second language 204 of Hindi. Thus, based on the language fallback matrix 200, the language recommendation engine 410 identifies the particular language that is associated with a language of personalized language hierarchy 416 by identifying Urdu from the first languages 202 and determining that Hindi of the second languages 204 is associated with Urdu. Additionally, the language recommendation engine 410 determines that the particular language of Hindi is not previously associated with the user profile 414. That is, the language recommendation engine 410 determines that Hindi is not one of the languages of the personalized language hierarchy 416, e.g., English, Punjabi, Urdu.

In some examples, the particular language is a fallback language for at least one language of the personalized language hierarchy 416. For example, the particular language of Hindi is a fallback language for Urdu of the personalized language hierarchy 416. In other words, the fallback language includes a language such that when a specific language is not supported, e.g., by the operating system of the mobile computing device 402 and/or an application executed by the mobile computing device 102, the fallback language is utilized by the mobile computing device 402, e.g., during execution of the application 420. In the illustrated example, for the language of Urdu of the personalized language hierarchy 416, the language recommendation engine 410 identifies Hindi as a fallback language for Urdu. Additionally, during execution of the application 420 by the mobile computing device 402, the mobile computing devices 402 and/or the application 420 determines that the application 420 does support Punjabi, Urdu, and English, e.g., the languages of the personalized language hierarchy 416. In response, the language recommendation engine 410 identifies the fallback language of Hindi such that the application 420 is executed and provides for display Hindi text via the first GUI 108a. In some examples, the one or more of the languages of the personalized language hierarchy 416 can be associated with two or more fallback languages.

In some examples, the language recommendation engine 410 is further in communication with query logs 422, e.g., over one or more networks. The query logs 422 can be associated with a plurality of users, including the user 406, and include data associated with queries provided to a web searching service. The associated data of the queries can include search results for the queries, and anonymized demographic data associated with the users providing the queries. The associated data of the queries can further include click through rates associated with the search results. To that end, the language recommendation engine 410 dynamically identifies the second languages 204 for each of the first languages 202 of the language fallback matrix 200 based on the query logs 422.

For example, a user of the plurality of users associated with the query logs 422 can submit queries in a specific language. In some examples, the user can also subsequently submit additional queries in a different language. The query logs 422 can indicate that the specific language and the different language are associated with each other based on the received query stream, e.g., the user understand the different language as well as the specific language. Additionally, for example, the user can submit a query in a specific language, and select a search result based on the query in a different language. The query logs 422 can indicate that the specific language and the different language are associated with each other based on the received user interaction. In some examples, the first languages 202 of the language fallback matrix 200 can include the specific language, and the second languages 204 can include the different language that is a fallback language for the specific language. In some examples, the first languages 202 of the language fallback matrix 200 can include the different language, and the second languages 204 can include the specific language that is a fallback language for the different language In some examples, the language recommendation engine 410 is further in communication with download logs 424, e.g., over one or more networks. The download logs 424 can be associated with a plurality of users, including the user 406, and include data associated with downloads of applications from an application marketplace. The associated data of the downloads can include which applications were downloaded, a number of downloads of the applications, and anoymized demographic data associated with the users downloading the applications. To that end, the language recommendation engine 410 dynamically identifies the second languages 204 for each of the first languages 202 of the language fallback matrix 200 based on the download logs 424.

For example, a user of the plurality of users associated with the download logs 424 previously indicates that they understand a specific language, e.g., via a user profile associated with the user. The user can further download an application that only supports a different language. The download logs 424 can indicate that the specific language and the different language are associated with each other based on this application download interaction by the user, e.g., the user understands the different language as well as the specific language. In some examples, the first languages 202 of the language fallback matrix 200 can include the specific language, and the second languages 204 can include the different language that is a fallback language for the specific language. In some examples, the first languages 202 of the language fallback matrix 200 can include the different language, and the second languages 204 can include the specific language that is a fallback language for the different language.

In some implementations, the language recommendation engine 410 provides a recommendation 426 to the user 406 to associate the particular language with their user profile 414. Specifically, the language recommendation engine 410 provides the recommendation 426 to the mobile computing device 402, and particularly, the application marketplace 420. In response, the mobile computing device 402 provides a second GUI 408b that provides for display the recommendation 426 to the user 406. In some examples, the second GUI 408b includes a listing 428 of languages of the personalized language hierarchy 416 and a status 430 of whether the languages of the personalized language hierarchy 416 are supported by the application marketplace 420 and/or the application available from the application marketplace 420. Additionally, the listing 428 includes the recommend language that is identified by the language recommendation engine 410. For example, the listing 428 includes the languages English, Punjabi, and Urdu of the personalized language hierarchy 416 and further includes a status 430 indicating that the application market place 420 and/or the application available from the application marketplace 420 does not support English, Punjabi, and Urdu. Additionally, the listing 428 includes the recommended language of Hindi that is identified by the language recommendation engine 410 with a status 430 that the application marketplace 420 and/or the application available from the application marketplace 420 does support Hindi.

In some implementations, the language recommendation engine 410 receives, in response to the recommendation, an indication of whether to associate the particular language with the user profile 414. Specifically, the second GUI 408b further includes a selectable button 432 that the user is able to select to download the application available from the application marketplace 420, and further indicate whether to associate the particular language with the user profile 414, e.g., whether the user 406 is able to understands the particular language that was identified by the language recommendation engine 410. For example, upon selection of the selectable button 432 by the user 406, the language recommendation engine 410 receives a confirmation 434 to associate the particular language with the user profile 414 of the user 146. That is, the language recommendation engine 410 receives the conformation 434 to associate Hindi with the user profile 414 of the user 406. Additionally, in some examples, upon selection of the selectable button 432 by the user 406, the user initiates download of the application from the application marketplace 420 to the mobile computing device 402, e.g., over one or more networks.

In some implementations, the language recommendation engine 410 updates the user profile 414 of the user 406 based on the received indication. In some examples, when the language recommendation engine 410 receives the confirmation 434 to associate the particular language with the user profile 414, the language recommendation engine 410 associates the particular language with at least one of the languages of the personalized language hierarchy 416 as a fallback language. In the illustrated example, the language recommendation engine 410 associates Hindi as a fallback language for Urdu. In some examples, the language recommendation engine 410 updates the personalized language hierarchy 416 to include the particular language based on receiving the conformation from the user 406 to associate the particular language with the user profile 414 associated with the user 406. For example, the language recommendation engine 410 updates the personalized language hierarchy 416 to include Hindi.

In some examples, the language recommendation engine 410 receives a rank associated with the particular language. That is, when the confirmation 434 to associate the particular language with the user profile 414 of the user 406 is provided, e.g., via the second GUI 408b, the user 406 can additionally provide a rank associated with the particular language. For example, the user 406 can indicate that Hindi is to be associated with a rank of 4. Specifically, the rank of the particular language indicates a positioning within the personalized language hierarchy 416. In some examples, the language recommendation engine 410 updates the personalized language hierarchy 416 based on the rank associated with the particular language. For example, the language recommendation engine 410 updates the personalized language hierarchy 416 such that Hindi is ranked as the fourth language.

To that end, the mobile computing device 402 provides a third GUI 408c that includes text 436 indicating a welcome message in the particular language. For example, the text 442 includes "Welcome" in Hindi.

Figure 5:
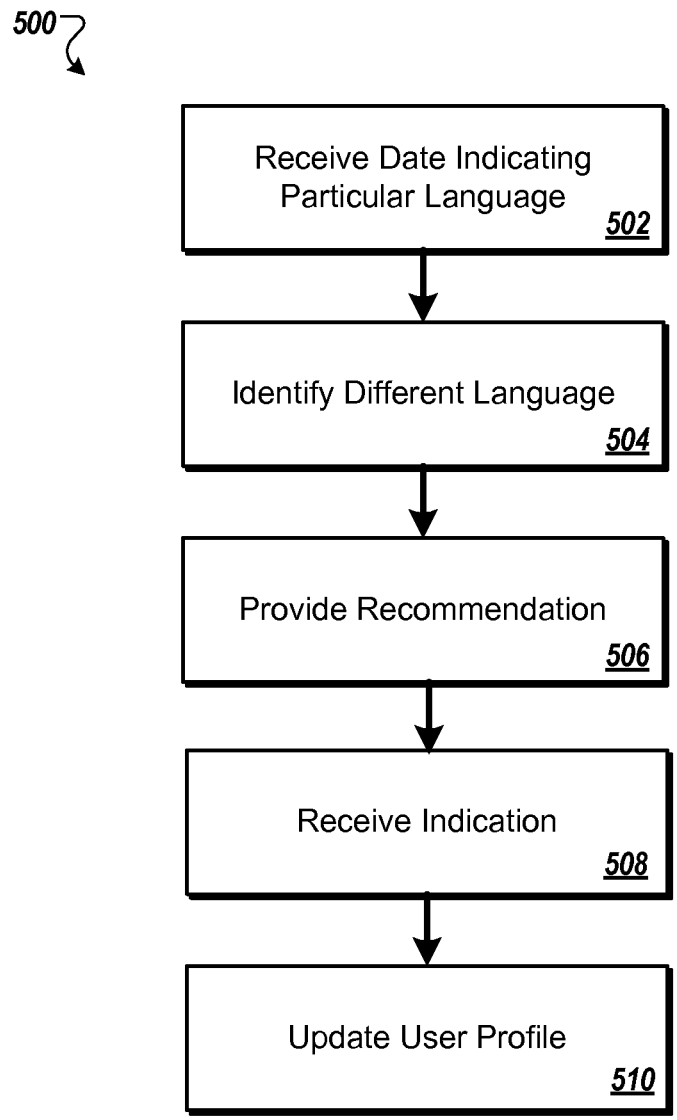
FIGS. 5-6 depict an example flowchart for providing language recommendations

FIG. 5 depicts a flowchart of an example process 500 for providing language recommendations. The example process 500 can be executed using one or more computing devices. For example, the mobile computing device 102, the server computing system 104, and the language recommendation engine 110 can be used to execute the example process 500.

Data indicating a particular language a user has associated with their user profile is received (502). For example, the language recommendation engine 110 receives data from the mobile computing device 102 that the user 106 has indicated that the particular language of Punjabi is associated with the user profile 114 of the user 106. A different language is identified that (i) the user has not previously associated with their user profile, and that (ii) the language recommendation engine has associated with the particular language (504). For example, the language recommendation engine 110 identifies the different language of Urdu that the user 106 has not previously associated with their user profile 114, and that the language recommendation engine 110 has identified as being associated with the particular language of Punjabi. A recommendation is provided to the user to associate the different language with their user profile (506). For example, the language recommendation engine 110 provides a recommendation to the user 106 to associate Urdu with their user profile 114. An indication is received, in response to the recommendation, of whether to associate the different language with the user profile (508). For example, the language recommendation engine 110 receives the indication of whether to associate Urdu with the user profile 114 of the user 106. The user profile is updated based on the indication (510). For example, the language recommendation engine 110 updates the user profile 114 based on receiving the indication.

Figure 6:
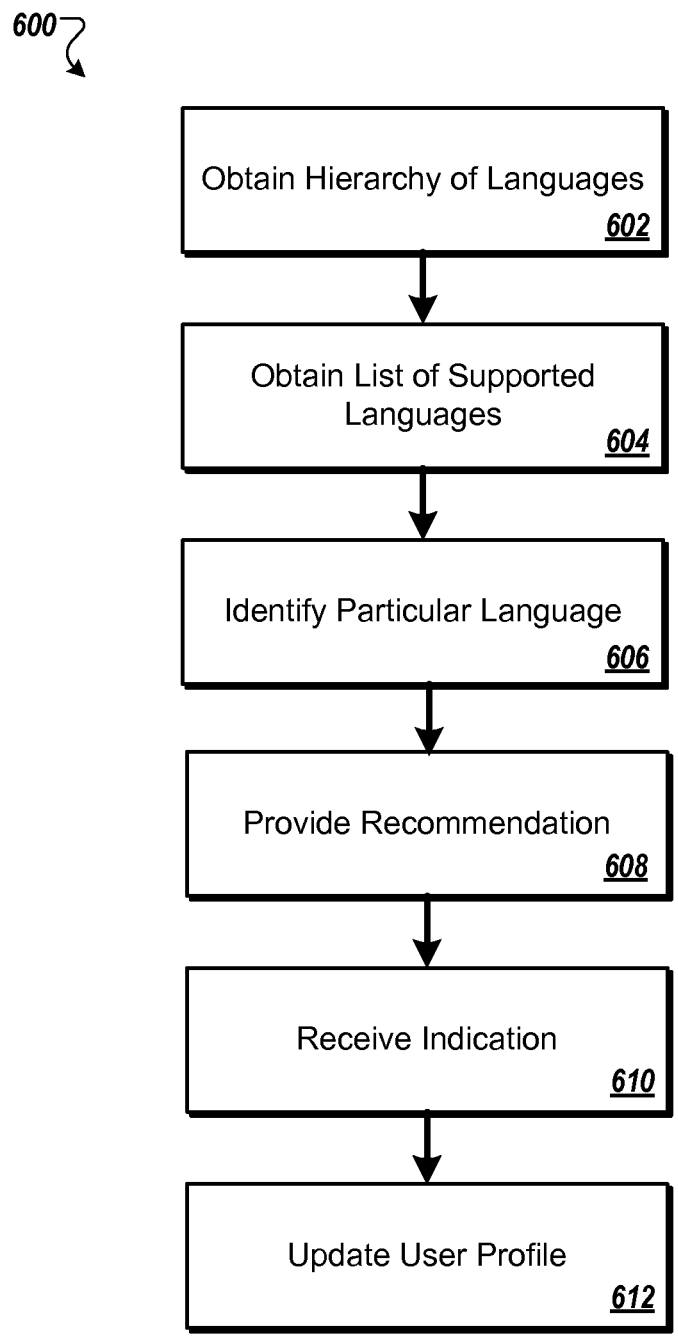

FIG. 6 depicts a flowchart of an example process 600 for providing language recommendations. The example process 600 can be executed using one or more computing devices. For example, the mobile computing device 302, the server computing system 304, and the language recommendation engine 310 can be used to execute the example process 600.

A hierarchy of languages is obtained that a user has associated with their user profile (602). For example, the language recommendation engine 310 receives the personalized language hierarchy 316 that the user 306 has associated with their user profile 314. The personalized language hierarchy 316 indicates that the languages English, Punjabi, and Urdu in a specified order. A list of supported languages is obtained that are associated with an application that is executable on a computing device associated with the user (604). For example, the language recommendation engine 310 obtains the list of languages 318 from the application 320. The list of languages 318 indicates that Hindi and Swedish are supported by the application 320. A particular language is identified from the list of supported languages that (i) the user has not previously associated with their user profile, and that (ii) a language recommendation engine has associated with one or more languages in the hierarchy of languages (606). For example, the language recommendation engine 310 identifies the language of Hindi from the list of languages 318 that is associated with the language Punjabi from the personalized language hierarchy 316 and that is not previously associated with the user profile 314. A recommendation is provided to the user to associate the particular language with their user profile (608). For example, the language recommendation engine 310 provides the recommendation 326 to the user 306 to associate Hindi with their user profile 314. An indication is received, in response to the recommendation, of whether to associate the particular language with the user profile (610). For example, the language recommendation engine 310 receives the confirmation 327 to associate Hindi with the user profile 314 of the user 306. The user profile is updated based on the indication (612). For example, the language recommendation engine 310 updates the user profile 314 of the user 106 to include Hindi as an associated language.

Figure 7:
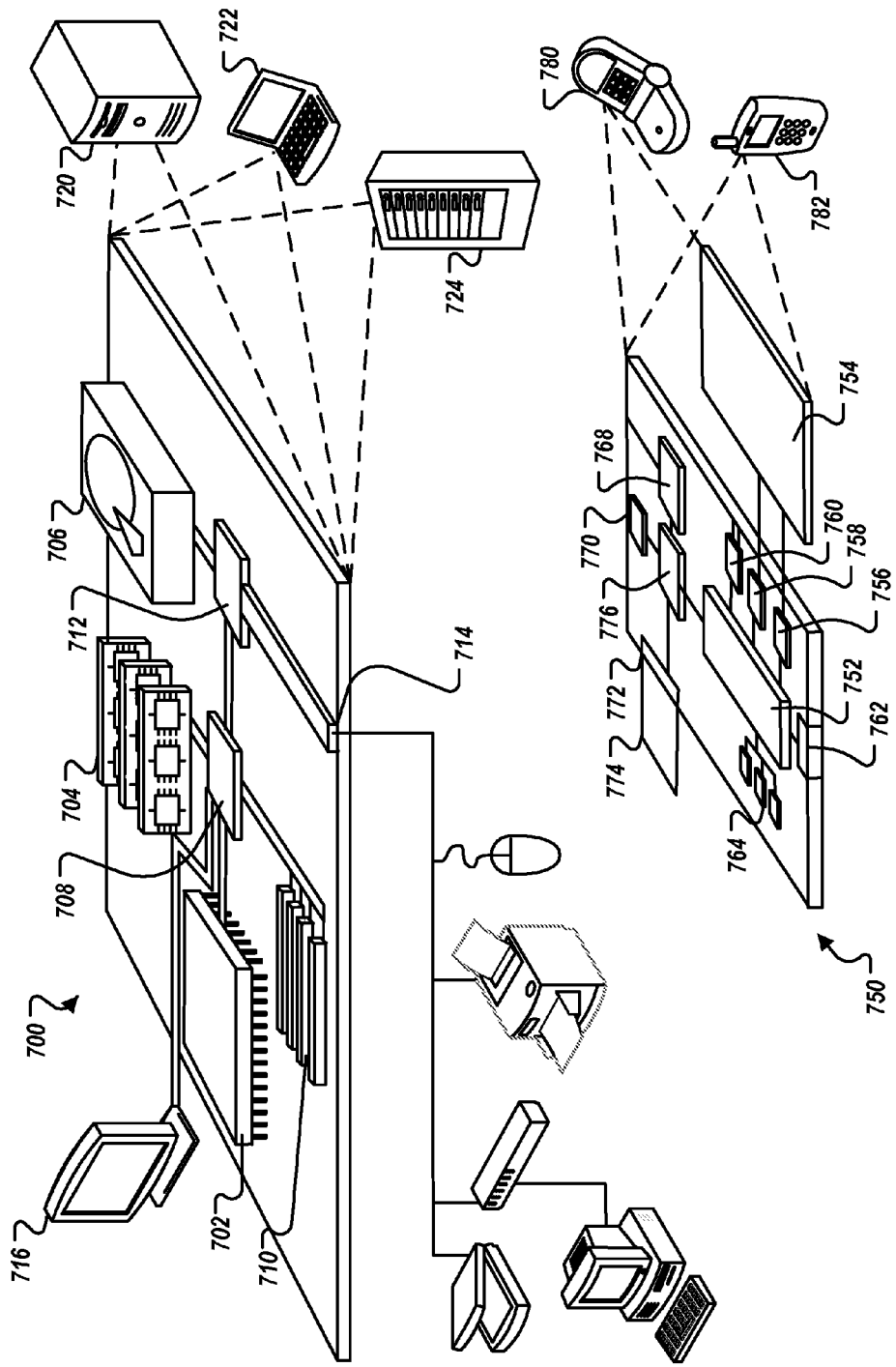
FIG. 7 depicts a computer device and a mobile computer device that may be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, or a memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 640, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 648 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 754 may also be provided and connected to device 750 through expansion interface 752, which may include, for example, a SIMM (Single In Line Memory Module) card interface. Such expansion memory 754 may provide extra storage space for device 750, or may also store applications or other information for device 750. Specifically, expansion memory 754 may include instructions to carry out or supplement the processes described above, and may include secure information also. Thus, for example, expansion memory 754 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 754, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 750 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
receiving, by a language recommendation engine of a system that includes at least (i) the language recommendation engine, and (ii) a search engine that includes a query log that stores data indicating respective languages associated with sequences of queries submitted by users of the search engine, data indicating a particular language that a user has associated with their user profile;
receiving, by the language recommendation and during installation of an application on a computing device, data including a list of languages that are natively supported by the application;
determining, by the language recommendation engine, that the list of languages that are natively supported by the application that is being installed on the computing device is exclusive of the particular language that is associated with the user profile of the user;
in response to determining that the list of languages that are natively supported by the application is exclusive of the particular language that is associated with the user profile of the user, identifying, by the language recommendation engine, a different language that (i) the user has not previously associated with their user profile, (ii) a language recommendation engine has previously determined, based on an analysis of the sequences of queries submitted by the users of the search engine and stored in the query log, to be a fallback language to the particular language that the user has associated with their user profile, and (iii) is included by the list of languages that are natively supported by the application that is being installed on the computing device;
providing, by the language recommendation engine, a recommendation to the user to associate, with their user profile, the different language that (i) the user has not previously associated with their user profile, (ii) the language recommendation engine has previously determined, based on an analysis of the sequences of queries submitted by the users of the search engine and stored in the query log, to be a fallback language to the particular language that the user has associated with their user profile, and (iii) is included by the list of languages that are natively supported by the application that is being installed on the computing device;
receiving, in response to the recommendation and by the language recommendation engine, an indication of whether to associate the different language with the user profile;
updating, by the language recommendation engine, the user profile based on the indication; and
providing, by the application that is installed on the computing device, a message in the different language that is included by the list of languages that are natively supported by the application, and that was previously not associated with the user profile.

2. The computer-implemented method of claim 1, wherein receiving, by the language recommendation engine, the indication of whether to associate the different language with the user profile further comprises receiving a confirmation to associate the different language with the user profile.

3. The computer-implemented method of claim 2, further comprising:
identifying, by the language recommendation engine, a hierarchy of languages that the user has previously associated with their user profile, the hierarchy of languages including the particular language,
wherein updating, by the language recommendation engine, the user profile further comprises updating the hierarchy of languages to include the different language based on receiving the confirmation to associate the different language with the user profile.

4. The computer-implemented method of claim 3, wherein receiving, by the language recommendation engine, the indication further comprises receiving a rank associated with the different language,
wherein updating, by the language recommendation engine, the hierarchy of languages to include the different language comprises updating the hierarchy of languages based on the rank associated with the different language.

5. The computer-implemented method of claim 1, wherein identifying, by the language recommendation engine, the different language further comprises:
obtaining, by the language recommendation engine, a matrix that associates, for one or more first languages that includes the particular language that is associated with the user profile of the user, one or more second languages for each first language, the one or more second languages including the different language.

6. The computer-implemented method of claim 5, further comprising dynamically identifying, by the language recommendation engine and for each of the one or more first languages, the one or more second languages based on the query log.

7. The computer-implemented method of claim 5, further comprising dynamically identifying, by the language recommendation engine and for each of the one or more first languages, the one or more second languages based on downloads of one or more applications by a plurality of users that are accessed from an application marketplace.

8. The computer-implemented method of claim 1, wherein receiving, by the language recommendation engine, the data indicating the particular language the user has associated with their user profile further comprises receiving data indicating that the user is able to understand the particular language.

9. A computer-implemented method comprising:
obtaining, by a language recommendation engine of a system that includes at least (i) the language recommendation engine, and (ii) a search engine that includes a query log that stores data indicating respective languages associated with sequences of queries submitted by users of the search engine, data indicating a hierarchy of languages that a user has associated with their user profile;
obtaining, by the language recommendation engine and during installation of an application on a computing device, data indicating a list of supported languages that are natively supported by the application;
determining, by the language recommendation engine, that the list of supported languages that are natively supported by the application that is being installed on the computing device is exclusive of each language of the hierarchy of languages that is associated with the user profile of the user;
in response to determining that the list of supported languages that are natively supported by the application is exclusive of each language of the hierarchy of languages that is associated with the user profile of the user, identifying, by the language recommendation engine, a particular language that (i) the user has not previously associated with their user profile, that (ii) a language recommendation engine has previously determined, based on an analysis of the sequences of queries submitted by the users of the search engine and stored in the query log, to be a fallback language to one or more languages in the hierarchy of languages that the user has associated with their user profile, and (iii) is included by the list of supported languages that are natively supported by the application that is being installed on the computing device;
providing, by the language recommendation engine, a recommendation to the user to associate, with their user profile, the particular language from the list of supported languages that (i) the user has not previously associated with their user profile, that (ii) a language recommendation engine has previously determined, based on an analysis of the sequences of queries submitted by the users of the search engine and stored in the query log, to be a fallback language to one or more languages in the hierarchy of languages that the user has associated with their user profile, and (iii) is included by the list of supported languages that are natively supported by the application that is being installed on the computing device;
receiving, in response to the recommendation and by the language recommendation engine, an indication of whether to associate the particular language with the user profile;
updating, by the language recommendation engine, the user profile based on the indication; and
providing, by the application that is installed on the computing device, a message in the different language that is included by the list of languages that are natively supported by the application, and that was previously not associated with the user profile.

10. The computer-implemented method of claim 9, wherein identifying, by the language recommendation engine, the particular language from the list of supported languages further comprises:
obtaining, by the language recommendation engine, a matrix that associates, for one or more first languages that includes at least one language of the hierarchy of languages that is associated with the user profile of the user, one or more second languages for each first language, the one or more second languages including the particular language.

11. The computer-implemented method of claim 10, further comprising dynamically identifying, by the language recommendation engine and for each of the one or more first languages, the one or more second languages based on the query log.

12. The computer-implemented method of claim 10, further comprising dynamically identifying, by the language recommendation engine and for each of the one or more first languages, the one or more second languages based on downloads of one or more applications by a plurality of users that are accessed from an application marketplace.

13. The computer-implemented method of claim 9, wherein receiving, by the language recommendation engine, the indication of whether to associate the different language with the user profile further comprises receiving a confirmation to associate the particular language with the user profile.

14. The computer-implemented method of claim 13, wherein updating, by the language recommendation engine, the user profile further comprises updating the hierarchy of languages that is associated with the user profile of the user to include the particular language based on receiving the confirmation to associate the particular language with the user profile.

15. The computer-implemented method of claim 14, wherein receiving, by the language recommendation engine, the indication further comprises receiving a rank associated with the particular language,
wherein updating the hierarchy of languages, by the language recommendation, further comprises updating the hierarchy of languages based on the rank associated with the particular language.

16. A system comprising:
one or more computers and one or more storage devices storing instructions that are operable, when executed by the one or more computers, to cause the one or more computers to perform operations comprising:
receiving, by a language recommendation engine of a system that includes at least (i) the language recommendation engine, and (ii) a search engine that includes a query log that stores data indicating respective languages associated with sequences of queries submitted by users of the search engine, data indicating a particular language that a user has associated with their user profile;
receiving, by the language recommendation and during installation of an application on a computing device, data including a list of languages that are natively supported by the application;
determining, by the language recommendation engine, that the list of languages that are natively supported by the application that is being installed on the computing device is exclusive of the particular language that is associated with the user profile of the user;
in response to determining that the list of languages that are natively supported by the application is exclusive of the particular language that is associated with the user profile of the user, identifying, by the language recommendation engine, a different language that (i) the user has not previously associated with their user profile, (ii) a language recommendation engine has previously determined, based on an analysis of the sequences of queries submitted by the users of the search engine and stored in the query log, to be a fallback language to the particular language that the user has associated with their user profile, and (iii) is included by the list of languages that are natively supported by the application that is being installed on the computing device;
providing, by the language recommendation engine, a recommendation to the user to associate, with their user profile, the different language that (i) the user has not previously associated with their user profile, (ii) the language recommendation engine has previously determined, based on an analysis of the sequences of queries submitted by the users of the search engine and stored in the query log, to be a fallback language to the particular language that the user has associated with their user profile, and (iii) is included by the list of languages that are natively supported by the application that is being installed on the computing device;
receiving, in response to the recommendation and by the language recommendation engine, an indication of whether to associate the different language with the user profile;
updating, by the language recommendation engine, the user profile based on the indication; and
providing, by the application that is installed on the computing device, a message in the different language that is included by the list of languages that are natively supported by the application, and that was previously not associated with the user profile.

17. A non-transitory computer-readable medium storing software comprising instructions executable by one or more computers which, upon such execution, cause the one or more computers to perform operations comprising:
receiving, by a language recommendation engine of a system that includes at least (i) the language recommendation engine, and (ii) a search engine that includes a query log that stores data indicating respective languages associated with sequences of queries submitted by users of the search engine, data indicating a particular language that a user has associated with their user profile;
receiving, by the language recommendation and during installation of an application on a computing device, data including a list of languages that are natively supported by the application;
determining, by the language recommendation engine, that the list of languages that are natively supported by the application that is being installed on the computing device is exclusive of the particular language that is associated with the user profile of the user;
in response to determining that the list of languages that are natively supported by the application is exclusive of the particular language that is associated with the user profile of the user, identifying, by the language recommendation engine, a different language that (i) the user has not previously associated with their user profile, (ii) a language recommendation engine has previously determined, based on an analysis of the sequences of queries submitted by the users of the search engine and stored in the query log, to be a fallback language to the particular language that the user has associated with their user profile, and (iii) is included by the list of languages that are natively supported by the application that is being installed on the computing device;
providing, by the language recommendation engine, a recommendation to the user to associate, with their user profile, the different language that (i) the user has not previously associated with their user profile, (ii) the language recommendation engine has previously determined, based on an analysis of the sequences of queries submitted by the users of the search engine and stored in the query log, to be a fallback language to the particular language that the user has associated with their user profile, and (iii) is included by the list of languages that are natively supported by the application that is being installed on the computing device;

receiving, in response to the recommendation and by the language recommendation engine, an indication of whether to associate the different language with the user profile;

updating, by the language recommendation engine, the user profile based on the indication; and providing, by the application that is installed on the computing device, a message in the different language that is included by the list of languages that are natively supported by the application, and that was previously not associated with the user profile.

* * * * *